Feb. 5, 1957 C. D. VISOS 2,780,711
SWITCH FOR VACUUM TYPE COFFEE MAKER
Filed July 27, 1954 2 Sheets-Sheet 1

INVENTOR
CHARLES D. VISOS
BY Bair, Freeman & Molinare
ATTORNEYS

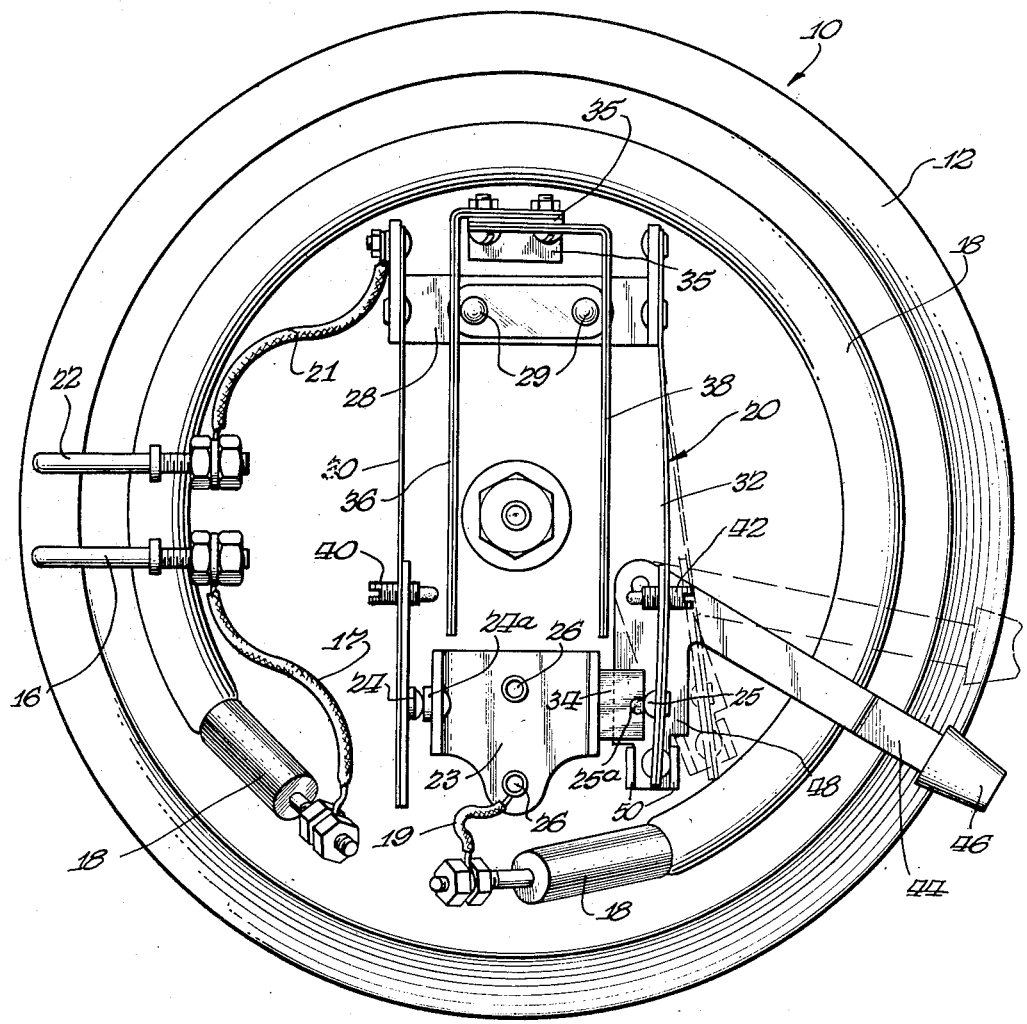

United States Patent Office 2,780,711
Patented Feb. 5, 1957

2,780,711

SWITCH FOR VACUUM TYPE COFFEE MAKER

Charles D. Visos, St. Louis, Mo., assignor to Knapp-Monarch Company, St. Louis, Mo., a corporation of Delaware Application July 27, 1954, Serial No. 446,134

4 Claims. (Cl. 219—20)

This invention relates to an improved lower bowl for a vacuum type coffee maker and to a switch mechanism therefor. This particular invention is an improvement over that disclosed in United States Patent No. 2,667,566.

In the above referred to patent, there is disclosed a particular structure for accomplishing certain end results. The purpose of this invention is to provide a construction which accomplishes broadly the same end results as that disclosed in the aforesaid patent, but to provide a mechanism which is much more simple and less expensive than that heretofore disclosed.

In the aforesaid patent, the contacts of the switch for the vacuum type coffee maker were mounted on swingably mounted arms which were biased in various directions by spring structures which were separate and apart from the swingably mounted arms. The use of swingably mounted contact bearing arms also required in the aforesaid structure the use of "pigtail" type leads for providing an electrical connection between a fixed binding post and the contact carried by the swingable arm, and, furthermore, these pigtail leads required insulating sleeves thereover. All of these various elements contribute to the over-all cost and complexity of the mechanism.

In the instant invention the swingably mounted arms, the spring structures, the pigtails, and the insulating sleeves for the pigtails, are all done away with and in their stead there is utilized contact bearing spring leaves which serve as part of the electrical circuits and which are so constructed and arranged as to normally bias the contacts carried thereon toward the positions in which they are to be biased by the spring structures of previous constructions. This results in the providing of a very simplified and inexpensive construction that efficiently accomplishes the job for which the structure is intended.

Thus, the object of this invention is to provide an improved and simplified construction of a vacuum type coffee maker which is operable to deenergize the coffee maker unit positively when the water has been discharged from the lower bowl to the upper bowl of the coffee maker, while at the same time embodying a simple, reliable structure that is readily manufactured without undue production expense.

It is another object of the present invention to provide an improved lower bowl unit for a coffee maker and a switch unit for the same.

A more particular object of this invention is to achieve the above objectives in a simple, inexpensive, reliable structure of manufacture which will stand abuse.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 3 shows the details of the switch of this invention.

Figure 1:
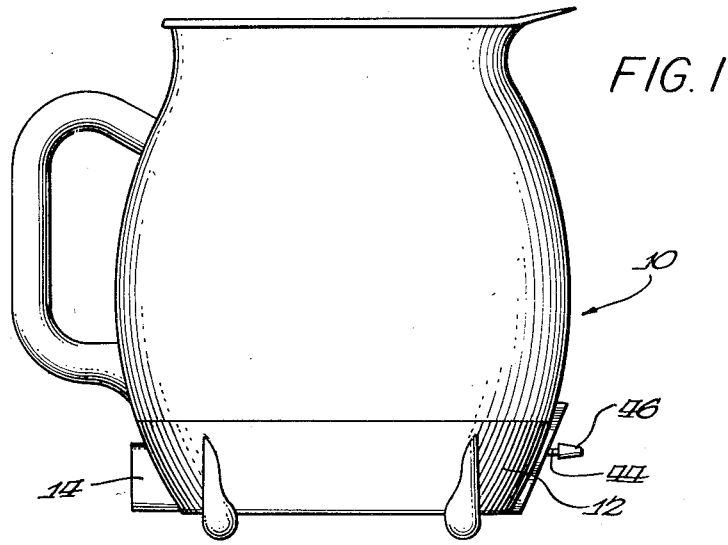
Figure 1 is a side elevation view of a lower bowl for a vacuum type coffee maker constructed in accordance with the present invention.

Referring now to the drawings, there is shown in Figure 1 the lower bowl 10 of a vacuum type coffee maker. This bowl is supported on a table or the like, by an enclosing bottom skirt 12 which is of insulating material, preferably a thermosetting plastic. As shown, this skirt is provided with a plug-receiving socket part 14.

In coffee brewing operations an upper bowl (not shown) containing coffee grounds is placed over bowl 10. Bowl 10, filled with water, is heated to boil out the water through a depending tube from the upper bowl provided for this purpose. When the water is nearly completely driven from the lower bowl to the upper bowl, the heat is cut off, causing vacuum action as the lower bowl cools to drive the resulting brew back into the lower bowl. The apparatus of the present invention assures that this cycle is positively carried out automatically and, in addition, that the returned brew in the lower bowl 10 is held at a desirable warm coffee serving temperature.

Figure 2:
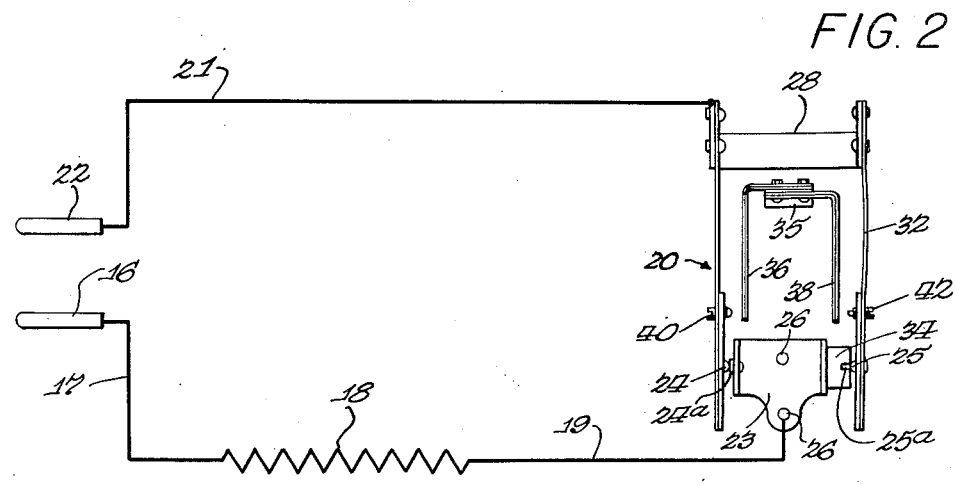
Figure 2 is a diagrammatic illustration of the circuit for a vacuum type coffee maker includng the switch of this invention.

As shown in Figure 2, a circuit for the heater in the lower bowl 10 includes a prong contact 16, line 17, a heating element 18, line 19, a switch mechanism generally indicated at 20, line 21, and prong contact 22. The prong contacts 16 and 22 are appropriately mounted on the bottom skirt 12 so as to project into the plug-receiving socket 14, in the well known manner.

The heater 18 for the lower bowl 10, although not shown, is generally a U-shaped tube of copper, or the like, which is soldered onto the bottom of bowl 10 to insure good heat contact therewith. The heater unit may include an insulating liner in which a Nichrome heating element is embedded. One end of the heating element may be connected to the prong 16 through line 17, and the other end of the heating element is adapted for connection by means of line 19 to the remainder of the electrical circuit which includes the switch 20.

Referring now particularly to the improved switch shown in Figure 3, there is provided a bracket, or contact-carrying member 23, which is electrically connected to the line 19 and which carries fixedly mounted thereon a contact 24a which is a keep-warm contact and contact 25a which is a brew contact. The bracket 23 serves as part of the circuit from line 19 to the brew and keep-warm contacts. Bracket 23 may be appropriately secured by rivets 26, or the like, to a mounting flange, or mounting mechanism, in the base of the bowl 10.

A second mounting bracket 28 is provided and it, too, is appropriately mounted on the base of the bowl 10 by means of rivets 29, or the like. This second mounting bracket 28 carries thereon a keep-warm spring leaf 30 and a brew spring leaf 32. The keep-warm spring leaf 30 carries thereon a keep-warm contact 24 which is adapted to engage the keep-warm contact 24a as shown. The keep-warm spring leaf is so constructed and arranged that normally the keep-warm contacts 24 and 24a engage each other, thus providing a closed circuit condition.

The brew spring leaf 32 carries thereon a brew contact 25 which is adapted to contact the brew contact 25a carried by the mounting bracket 23. A magnet 34 is carried by the mounting bracket 23, and this magnet is operative to cause magnetic attraction between it and the spring leaf 32, the spring leaf 32 thereby serving as the magnet keeper. The spring leaf 32 is so constructed and arranged that the resiliency of the spring leaf is designed to separate the contacts 25 and 25a so as to keep the contacts normally in the open circuit condition. The maximum magnetic force between the magnet 34 and the spring leaf 32 is operative to overcome the resiliency of the spring leaf 32 which normally tends to separate the contacts 25 and 25a. As shown, the bracket 28 which is electrically connected to the spring leaves 30 and 32, and thereby electrically connected to the keep-warm and brew contacts 24 and 25 carried by the spring leaves, is itself connected to line 21 of the energizing circuit of the coffee maker.

In addition to the structure thus far disclosed, there are provided a pair of bimetal elements which are carried by a heat conducting mounting bracket 35 which is appropriately secured to the bottom of the lower bowl 10 so that the temperature of the lower bowl 10 is communicated through it to the bimetals. The first bimetal 36 is the keep-warm bimetal and is adapted to cooperate with the keep-warm spring leaf 30 when the temperature of the bowl 10 rises above a first predetermined temperature, or keep-warm temperature, to cause opening of the circuit between the contacts 24 and 24a. The second bimetal 38 is the brew bimetal and is adapted to cooperate with the brew spring leaf 32 to cause separation of the brew contacts 25 and 25a after a second predetermined temperature has been reached in the lower bowl 10. The second predetermined temperature is higher than the first predetermined temperature.

The movement of the brew bimetal 38 must be so related to the brew spring leaf 32, and the forces between the magnet 34 and the brew spring leaf 32, as to apply sufficient force to overcome the magnetic force at a point after the greater portion of the water in the lower bowl 10 has been caused to enter the upper bowl, or toward the end of the coffee brewing operation.

To provide for the various adjustments and calibrations for range of movement and operating temperatures between the bimetals 36 and 38 and the spring leaves 30 and 32, adjustment screws are provided which are carried by the various spring leaves. Thus, the keep-warm spring leaf 30 carries a screw adjustment 40 which can be calibrated to a desired keep-warm temperature and the brew spring leaf 32 carries a screw adjustment 42 which may also be adjusted and calibrated to cause opening of the contacts 25 and 25a at the particular temperature that is sought to be obtained within the lower bowl 10. The adjustment screws 40 and 42 are positioned to be engaged by the bimetals 36 and 38, and, accordingly, these adjustment screws 40 and 42 provide an extremely simple means of calibrating and adjusting the entire mechanism.

In addition to the above, a manually operable control 44 is provided having a control knob 46 which extends outwardly of the coffee bowl 10. The knob 46 is carried on a control arm 48 which is pivotally mounted on some portion of the structure of the lower bowl 10. Integral with the control arm 46 is a brew spring leaf engaging arm 48 which has upwardly extending spaced prongs 50 which are positioned on opposite sides of the extended end of the brew spring leaf 32. The control 46 is manually movable either to the position shown in full lines—wherein the contacts 25 and 25a are brought into contact with each other for setting the coffee maker circuit for the brewing operation—or to the position shown in dashed lines—wherein the contacts 25 and 25a are separated, in which position the temperature within the coffee maker cycles about the keep-warm temperature.

The spring force of the spring leaf 32 is sufficient to cause pivoting of the control 46 from the full line position to the dashed line position after the magnetic force between the magnet 34 and the spring leaf 32 has been overcome. Thus, the position of the manual control 46 gives a visual indication as to what the condition is of the switch means within the coffee maker, and one is able to determine whether the operation going on in the coffee maker is the brewing operation or the keep-warm operation.

In the operation of this coffee maker, when the lower bowl 10 is filled with water, the upper bowl (not shown) is in position, and coffee is to be brewed, the prongs 16 and 22 are connected to a suitable source of electrical energy. At this time the parts have the positions shown in Figure 3, thus energizing the heater 18 through both the keep-warm contacts 24 and 24a and through the brew contacts 25 and 25a.

Figure 4:
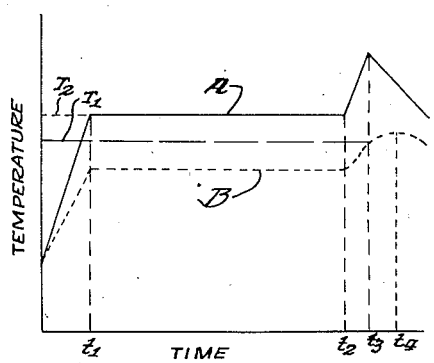
Figure 4 is a chart showing the temperatures of the coffee maker unit during a brewing operation.

The bottom of the bowl 10 then heats as shown by curve A, in Figure 4, until time $t_1$ is reached. At this time temperature $T_2$ is at water-boiling temperature and water is boiled out of the lower bowl, through the depending tube of the upper bowl into the upper bowl. Concurrently with this action, the two bimetals 36 and 38 heat along the curve B, this heating being to a temperature determined by their heat losses to the surrounding parts, their thermal conductivity, the thermal conductivity of the mounting bracket 35 and the heat conductivity of the bracket 35.

Prior to the time $t_1$, the keep-warm bimetal 36 engages the keep-warm spring leaf 30 and throws it to open circuit position. When the water has nearly boiled out of the lower bowl 10, the bottom thereof becomes water-free and the temperature curve A suddenly rises. This is shown at $t_2$, Figure 4. The bimetals 36 and 38 partake of this temperature increase at a somewhat lower rate by reason of their own thermal capacity and that of bracket 35 and the various bolts, nuts and rivets which provide attachment means between the parts. However, at the time $t_3$ the bimetal 38 reaches its contact-breaking temperature $T_1$ and overcomes the attraction of the magnet 34 to the magnet keeper, brew spring leaf 32, to cause separation of the contacts 25 and 25a and causing the heater 18 to become deenergized, since the contacts 24 and 24a have previously been opened.

This action does not immediately arrest the effective temperature rise of the bimetals. The bottom of the bowl 10 is still at a higher temperature than these parts because of the heat resistance of the brackets 35, bimetals 36 and 38 and their thermal inertia. As a consequence, the temperature curve B of the bimetals continues to climb after $t_3$, when the heater 18 is deenergized.

The continued heating of the bimetals 36 and 38 causes them to reach a peak temperature at $t_4$ and then to cool with the other parts of the unit. Prior to reaching this temperature, however, the bimetal 38 drives the spring leaf arm 32 to an open position where the bias of spring leaf 32 overcomes the attraction of the magnet 34. At this time the resiliency of the spring leaf 32 takes control and drives the spring leaf 32 to the full open position where it remains until reset by movement of the manual control 46.

After the above action, the unit cools and the brew is returned by vacuum action to the lower bowl 10. It is thereafter retained at a suitable drinking temperature by the bimetal 36 which engages the spring leaf arm 30 and which causes cyclic opening and closing of the contacts 24 and 24a to energize the heater 18 intermittently, and thereby maintaining the desired temperature in the lower bowl 10.

It will be noted that the spring leaf 32 is only driven to the positively opened position by the continued heating of bimetal 38 after the element 18 is deenergized. This continued heating is achieved by so choosing the thermal conductivity of the parts 35, 36, and 38, their thermal capacity, and their dissipation of heat to the other parts, that the bottom of the bowl 10 continues to heat the bimetals after deenergization of element 18. This continued heating effect is made more pronounced by increasing the thermal resistance of these parts and increasing their surface area so that the bimetal temperature is substantially below the temperature of the bottom of the bowl. The continued heating effect is improved by limited increase of the size of these parts as this causes the heater to remain energized until the actual bowl temperature is well above the contact-opening temperature of the bimetal 38. Undue increase in the size of the parts, however, causes the response to be so sluggish that no effective temperature increase occurs at bimetal 38 after contacts 25 and 25a open.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. In a coffee maker of the vacuum type having a lower bowl and an upper bowl, the improvement comprising: a heater for the lower bowl; energizing means including a pair of relatively movable switch contacts operable when closed to energize the heater; a permanent magnet on one contact; a magnet keeper on the other contact; one of said contacts being mounted on a fixedly mounted spring leaf which is arranged so that the inherent resiliency of the spring leaf tends to bias said one of the contacts away from said other contact, said inherent resiliency of the spring leaf being incapable of overcoming the full magnet attraction; a bimetal arm; a support post affixed to the bottom of the lower bowl and supporting the bimetal in position to engage the spring leaf and to urge the spring leaf contact away from said other contact with increased temperature and to open the contacts when the temperature of the lower bowl exceeds water-boiling temperature, the effective thermal capacity of the support post and bimetal being so related to their heat conducting ability and heat losses as to cause the bimetal to continue flexing after the contacts separate.

2. In a coffee maker of the vacuum type having a lower bowl and an upper bowl, the improvement comprising: a heater for the lower bowl; energizing means including a pair of relatively movable switch contacts operable when closed to energize the heater, one contact being supported in fixed relation to the lower bowl and the other contact being supported by a fixedly mounted but flexible spring leaf; a permanent magnet on one of said contacts; a magnet keeper on the other contact; said spring leaf being so constructed and arranged that its inherent resiliency tends to move the contact thereon in a contact breaking direction but said spring leaf's inherent resiliency being incapable of overcoming the full magnet attraction; a bimetal arm; a support post affixed to the bottom of the lower bowl and supporting the bimetal in position to urge the contacts to spaced relation with increased temperature and to open the contacts when the temperature of the lower bowl exceeds water-boiling temperature, the effective thermal capacity of the support post and the bimetal being so related to their heat conducting ability and heat losses as to cause the bimetal to continue flexing after the contacts separate.

3. A control mechanism for the lower bowl of a vacuum type coffee maker, the mechanism comprising: a support post affixed to the bottom of the bowl; a pair of spaced bimetal arms extending outwardly from the post; a pair of elongated flexible spring leaves fixedly mounted relative to the bottom of the bowl and bearing contacts thereon and being cooperatively associated with the bimetal arms respectively and adapted to be engaged thereby as the temperature rises; a unitary contact structure cooperatively associated with a pair of contact-bearing spring leaves respectively and positioned to assume an open circuit relation under the bias of the bimetal arms as temperature rises; a heater; means defining an energizing circuit through the contact structure and the contact-bearing spring leaves in parallel to the heater; one of said spring leaves being so constructed and arranged that its inherent resiliency tends to keep the contact thereon in the closed circuit position and being of strength to be overcome by the bimetal below water-boiling temperature; magnet means urging the second contact-bearing spring leaf in the closed circuit direction; said second spring leaf being so constructed and arranged that its inherent resiliency tends to move the contact borne thereon to contact breaking position but said spring leaf's inherent resiliency being incapable of overcoming the full magnet pull, the effective thermal capacity, thermal conduction and heat losses of the support post and the bimetal cooperating with said second spring leaf being such as to cause the bimetal to continue flexing after the contacts separate.

4. A control mechanism for the lower bowl of a vacuum type coffee maker, the mechanism comprising: a support post affixed to the bottom of the bowl; a pair of spaced bimetal arms extending outwardly from the arm; a pair of contact bearing spring leaves fixedly mounted relative to the bottom of the bowl and being cooperatively associated with the bimetal arms respectively and adapted to be engaged thereby as the temperature rises; a unitary contact structure cooperatively associated with the contact-bearing spring leaves respectively and positioned to assume an open circuit relation under the bias of the bimetal arms as temperature rises; a heater; means defining an energizing circuit to the heater through the contact structure and the contact-bearing spring leaves in parallel; one of said spring leaves being so constructed and arranged that its inherent resiliency tends to keep the contact thereon in a closed circuit position and being of a strength to be overcome by the bimetal below water-boiling temperature; magnet means urging the second contact-bearing spring leaf in the closed circuit direction; and lever means operable from outside the lower bowl adapted to swing said second spring leaf selectively to contact-making or contact-breaking positions, and said second spring leaf being so constructed and arranged that its inherent resiliency tends to move the contact borne thereon to contact-breaking position but said spring leaf's inherent resiliency being incapable of overcoming the full magnet pull.

References Cited in the file of this patent

UNITED STATES PATENTS

| | | |
|---|---|---|
| 1,958,482 | Leins | May 15, 1934 |
| 2,076,096 | Samuels et al. | Apr. 6, 1937 |
| 2,601,556 | Prouty | June 24, 1952 |
| 2,610,283 | Kolisch | Sept. 9, 1952 |
| 2,651,707 | Jepson | Sept. 8, 1953 |
| 2,667,566 | Huck et al. | Jan. 26, 1954 |